Dec. 13, 1949  F. T. FORSTER  2,491,370

EXPLOSION-PROOF VENT PLUG FOR STORAGE BATTERIES

Filed June 21, 1946

INVENTOR
F. T. FORSTER
BY
ATTORNEY

Patented Dec. 13, 1949

2,491,370

UNITED STATES PATENT OFFICE 2,491,370

EXPLOSION-PROOF VENT PLUG FOR STORAGE BATTERIES

Frank T. Forster, New York, N. Y., assignor to Bell Telephone Laboratories, Incorporated, New York, N. Y., a corporation of New York Application June 21, 1946, Serial No. 678,207

5 Claims. (Cl. 136—179)

This invention relates to storage batteries and particularly to storage batteries of the type wherein potentially combustible or explosive gases are generated during the charging or discharging of the batteries.

In storage batteries generally, and particularly in storage batteries of the lead acid type, containing lead oxide plates and sulphuric acid, hydrogen and oxygen gases are generated during charging and discharging periods. These gases, when combined, form a mixture which is potentially highly explosive. In the enclosed type of battery, that is, in a battery having a cover, these gases usually pass from the battery into the surrounding atmosphere through a vent plug. It has been found that should a spark or arc originating from a statically charged tool or other testing device come in contact with the gases escaping from the vent the gases would ignite and explode. Since the gases are generated within the battery there is usually an accumulation thereof below the battery cover so that the ignition of the gases emanating from the vent would result in the explosion of these accumulated gases within the battery with destructive results to the battery and with possible serious injury to anyone in the vicinity of the battery at the time of the explosion.

It is the object of this invention to eliminate the explosion hazard produced by combustible gases generated within a storage battery.

This object is attained in accordance with a feature of the invention by the provision of means for cooling the gases in their passage from the battery to the exterior thereof. More particularly, the area within the battery in which the generated gases collect and mix is separated from the exterior of the battery into which the gases escape, by a screen of porous glass, ceramic or other equivalent material which permits the gases to escape therethrough and at the same time lowers the temperature thereof below that at which they readily ignite.

In accordance with a particular feature of the invention the said porous screen is made in the form of a solid sleeve, or cylindrical tube which adapts itself for convenient embodiment in the structure of a vent tube which may be removably mounted in a suitable orifice in the cover of the battery.

A further feature of the invention contemplates the mounting of the porous screen on the underside of the battery cover independently of the vent tube itself.

A still further feature of the invention, which is ancillary to the immediately preceding feature combines the mounting of the porous screen on the underside of the battery cover with the mounting of any suitable type of explosion-proof vent plug in the usual orifice in the battery cover. This combination provides protection against gas explosions should the regular vent plug fail or, through inadvertence or carelessness not be replaced in the battery cover after its removal therefrom for maintenance or other reasons.

These and other features of the invention will be readily understood from the following detailed description when read in connection with the accompanying drawings, in which.

Figure 1:
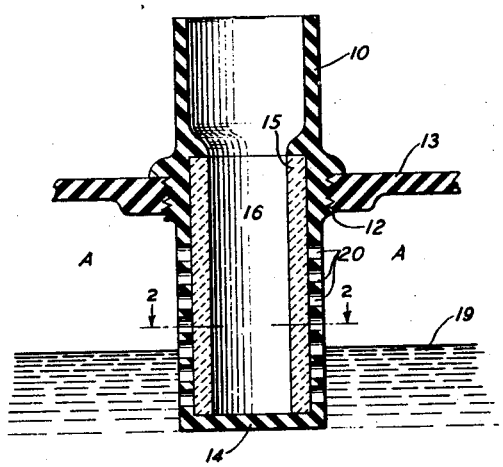
Fig. 1 is a longitudinal sectional view of a battery vent plug embodying features of the invention.
Figure 2:
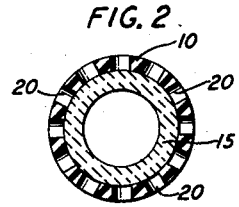
Fig. 2 is a section taken along the line 2—2 of Fig. 1, looking in the direction of the arrows.

Referring particularly to Fig. 1 the cover of a storage battery is indicated at 13. This cover is provided with an orifice 12 the peripheral boundary of which is threaded to accommodate the vent plug 10 which is externally threaded as shown. The plug 10 is essentially an elongated tube of hard rubber, alloy, or other suitable material. The plug 10 is of such a length that, when screwed into the battery cover 13, its upper end projects upwardly from the cover and its lower end extends downwardly from the cover so as to be partially submerged in the electrolyte 19 contained in the battery.

That portion of the plug which extends below the battery cover is perforated, the perforations being indicated by the numeral 20. This portion of the plug 10 is interiorly lined with a sleeve or cylindrical tubing 15 which may be made of a porous solid glass, ceramic, or similar material which permits the passage of gas therethrough without appreciable absorption of moisture therefrom. A specific material suitable for the purpose is fired clay which is sufficiently porous. The tubing 15 is solid in form, that is, it has a set geometric configuration and may be made by molding or by any other suitable process. This tubing may be cemented or otherwise suitably fixed in position as an interior lining of the lower perforated portion of the tube 10.

It will be observed that when the vent tube is screwed into the orifice 12 in the battery cover so that its lower end is submerged in the electrolyte contained in the battery, any gases that are generated within the battery pass into the area A between the cover 13 and the level of the electrolyte 19, whence they pass through the perforations 20, through the porous member 15 into the chamber 16 of the plug and thence out into the surrounding atmosphere by way of the open mouth of the plug. In passing through the porous member 15 the gases are cooled. If, through accident, a spark is introduced into the chamber 16, or contacts the gases emanating from the mouth of the plug the gas within the chamber 16 may be caused to ignite and to flame within the plug. However, with an adequate radiating surface of the porous member 15 the flame will not be sustained and will immediately become extinguished. Furthermore, should there be any tendency for the flame within the chamber 16 to be sustained, the presence of the porous member 15 between the flaming gas and the interior of the battery precludes the possibility of the gases within the battery ever reaching the temperature at which they would ignite. Furthermore, due to the cooling effect of the member 15 on the gases, the flame cannot follow through this member into the area A within the battery. Explosion of the gases within the battery therefore is completely prevented.

In Fig. 1 the plug 10 is illustrated as having a bottom wall 14. This bottom wall may be omitted particularly if, as intended, the porous member 15 passes the battery gases without appreciable pressure being produced within the battery.

Figure 3:
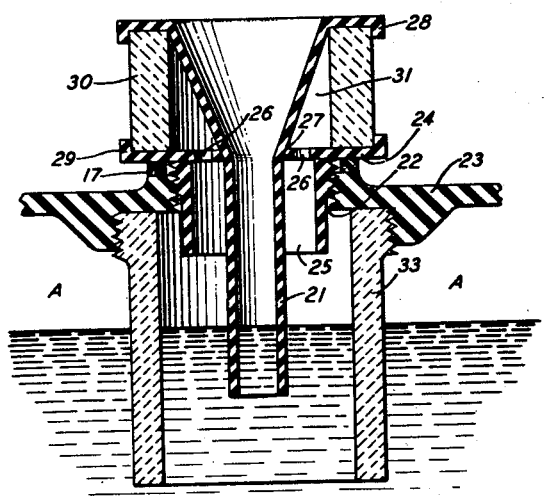
Fig. 3 is a longitudinal sectional view of an explosion-proof vent plug removably mounted, exteriorly of the battery cover, in an orifice in the cover and of a porous flame-arresting device mounted on the underside of the battery cover.
Figure 4:
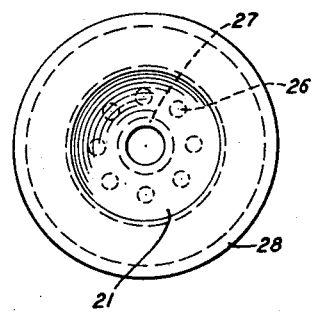
Fig. 4 is a top plan view of the vent plug shown in Fig. 3.

In Fig. 3 the battery cover 23 is provided with an orifice 22 which is adapted to accommodate any suitable type of explosion-proof vent plug. The plug illustrated, by way of example, comprises a funnel 21 of any suitable material, and a molded base 24 having a depending cylindrical sleeve 25 which is adapted to be removably fixed in the orifice 22 of the battery cover 23. The horizontal portion of the molded base 24 is provided with a relatively large centrally disposed hole 27 through which the stem of the funnel 21 projects, and with a series of smaller vent holes 26 arranged in a circle about the larger hole 27. A gasket 17 may be provided if desirable.

The upper edge of the funnel is provided with a circular flange from which a circular lip or rim 28 depends. A similar circular lip or rim 29 projects upwardly from the outer edge of the molded base 24. Within the circular rims 28 and 29 is located a short cylindrical tube 30 which is made of porous stone, glass, ceramic or other equivalent material. The lower edge of the tube 30 rests upon the upper face of the molded base 24 and its upper edge abuts the underside of the flanged portion of the funnel 21. This member 30 may be cemented or otherwise suitably fixed in position. By virtue of the vertical interior face of the member 30 and the sloping exterior face of the mouth portion of the funnel 21 an expansion chamber 31 is effected. This chamber communicates with the interior of the battery by way of the vent holes 26 and the annular space defined by the interior face of the sleeve 25 and the exterior of the funnel stem.

The funnel stem is sufficiently long so that its lower end projects below the level of the electrolyte contained in the battery.

Screwed or otherwise fixed to the underside of the battery cover 23 is a cylindrical tube 33 which is made of porous glass, ceramic or other equivalent material. This tube is disposed in coaxial spaced relation to the stem of funnel 21 and is of sufficient length to project below the surface of the electrolyte.

It will be observed that the porous member 33 is fixed to the underside of the cover and is not an integral part of the vent tube.

Gases generated within the battery pass into the area A between the electrolyte and the battery cover, through the porous member 33, and thence up through the space between the interior of the sleeve 25 and the exterior of the funnel stem, through the vent holes 26, into the chamber 31 defined by the interior and exterior surfaces of the member 30 and the funnel mouth, respectively, through the walls of the porous member 30 into the surrounding atmosphere.

The porous member 30 performs the same general purpose of the sleeve 15 of Fig. 1, that is, it precludes the possibility of the explosion of the gases within the battery. In either case the interior of the battery is, in effect, isolated from the exterior atmosphere by the flame-arresting porous member.

While the vent plug, per se, just described adequately serves to preclude the possibility of gas explosions within the battery, it is obvious that this purpose can be served only when the plug is screwed, or otherwise fixed in position on the battery cover. Should the plug be removed and not replaced, the gases emanating from the open vent hole could be accidentally ignited resulting in a destructive explosion of the gases in area A within the battery. To provide against such an eventuality the lower porous member 33 is fixed to the underside of the battery cover so that should the vent plug be left out of its orifice in the battery cover the battery would still be protected and the gases generated in the battery could not explode incident to the accidental ignition of the gases emanating from the open orifice in the battery cover.

What is claimed is:

1. A storage battery containing electroylte, a cover for said battery having an orifice therein, and a tube of ceramic material surrounding the orifice in said cover and projecting downwardly from said cover to a point below the level of the electrolyte contained in said battery.

2. In combination, a storage battery containing electrolyte, a cover for said battery having an orifice therein, an explosion-proof vent plug mounted in the orifice in said cover and having its lower end submerged in the electrolyte contained in said battery, and a sleeve of ceramic material mounted on the underside of said cover and encompassing the lower end of said vent plug.

3. In combination, a storage battery containing electrolyte, a cover for said battery having an orifice therein, an explosion-proof vent plug mounted in the orifice in said cover and having a tubular portion thereof extending below said cover with its end submerged in the electrolyte contained in said battery, and a cylindrical tube of ceramic material projecting downwardly from the underside of said cover to a point below the level of the said electrolyte in concentric relation to the said tubular portion of said plug.

4. In combination, a storage battery containing electrolyte, a cover for said battery having an orifice therein, an explosion-proof vent plug removably mounted in the orifice of said cover and having one end thereof projecting downwardly into said battery to a point below the level of the electrolyte contained in said battery, and a ceramic shield mounted on the underside of said cover in spaced coaxial relation to the downwardly projecting end of said plug.

5. In combination, a storage battery containing electrolyte, a cover for said battery having an orifice therein, said cover and said electrolyte defining an area in which gases generated within said battery collect, an explosion-proof vent plug disposed in the orifice in said cover having a tubular extension thereof projecting within said battery to a point below the level of the electrolyte contained in said battery, and a wall of ceramic material depending from said cover and separating the said tubular extension of said vent plug from the said gas collecting area.

FRANK T. FORSTER.

REFERENCES CITED

The following references are of record in the file of this patent:

UNITED STATES PATENTS

| Number | Name | Date |
| --- | --- | --- |
| 2,298,938 | Griffin et al. | Oct. 13, 1942 |
| 2,309,331 | Rupp | Jan. 26, 1943 |
| 2,400,228 | Franz et al. | May 14, 1946 |
| 2,452,066 | Murphy | Oct. 26, 1948 |

FOREIGN PATENTS

| Number | Country | Date |
| --- | --- | --- |
| 2,727 | Great Britain | of 1908 |
| 319,198 | Great Britain | Sept. 17, 1929 |
| 323,911 | Italy | Jan. 12, 1935 |
| 560,087 | France | June 29, 1923 |